(12) United States Patent
Gärdin (10) Patent No.: US 9,174,367 B2
(45) Date of Patent: Nov. 3, 2015

(54) NON-UNIFORM CYLINDER (75) Inventor: Mats Gärdin, Vasteras (SE)

(73) Assignee: AVURE TECHNOLOGIES AB, Vasteras (SE)

(*) Notice: Subject to any disclaimer, the term of this patent is extended or adjusted under 35 U.S.C. 154(b) by 0 days.

(21) Appl. No.: 13/978,204

(22) PCT Filed: Jan. 3, 2011

(86) PCT No.: PCT/EP2011/050027
§ 371 (c)(1),
(2), (4) Date: Sep. 9, 2013

(87) PCT Pub. No.: WO2012/092960
PCT Pub. Date: Jul. 12, 2012

(65) Prior Publication Data
US 2013/0344190 A1    Dec. 26, 2013

(51) Int. Cl.
*B30B 11/00* (2006.01)
*B29C 35/02* (2006.01)
*B22F 3/00* (2006.01)
*F16J 12/00* (2006.01)

(52) U.S. Cl.
CPC ............ *B29C 35/0227* (2013.01); *B22F 3/003* (2013.01); *B30B 11/002* (2013.01); *F16J 12/00* (2013.01)

(58) Field of Classification Search
CPC ....................... B30B 11/002; Y10S 425/026
USPC ............. 425/149, 1, 150, 405.2, 170; 264/83
See application file for complete search history.

(56) References Cited

U.S. PATENT DOCUMENTS

| | | | |
|---|---|---|---|
| 3,451,101 A | 6/1969 | Bowles | |
| 3,900,189 A | 8/1975 | Elgren et al. | |
| 3,993,433 A | 11/1976 | Isaksson et al. | |
| 2004/0004314 A1 | 1/2004 | Yoneda et al. | |

FOREIGN PATENT DOCUMENTS

| | | |
|---|---|---|
| DE | 1450447 | 1/1969 |
| FR | 874274 | 8/1942 |
| FR | 1542886 | 10/1968 |
| JP | 568718 | 2/1981 |
| JP | 04084696 | 3/1992 |
| JP | 09038797 | 12/1995 |
| JP | 8219656 | 8/1996 |
| JP | 2004-037054 | 2/2004 |
| JP | 49-81279 | 7/2012 |
| SU | 1061933 | 12/1983 |
| SU | 1574368 | 6/1990 |
| WO | 01/14087 | 3/2001 |
| WO | 2010/102645 | 9/2010 |

*Primary Examiner* — Jacob Thomas Minskey
(74) *Attorney, Agent, or Firm* — Allen, Dyer, Doppelt, Milbrath & Gilchrist, P.A.

(57) ABSTRACT

The present invention relates to an arrangement for treatment of articles by hot pressing and, in particular, by hot isostatic pressing. In particular, the present invention relates to a pressing arrangement for treatment of articles by hot pressing, and preferably hot isostatic pressing, capable of providing a controlled, rapid cooling rate. The pressing arrangement comprises a pressure vessel including a furnace chamber comprising a heat insulated casing and a furnace adapted to hold the articles. At least one cooling circuit is arranged on an outside of the pressure vessel, the cooling circuit comprising a coolant and being arranged to enable the coolant to flow along a central portion of an outer wall of the pressure vessel. The pressure vessel is arranged with a non-uniform wall thickness, where the vessel wall is thickest at upper and lower end portions of the pressure vessel.

9 Claims, 4 Drawing Sheets

NON-UNIFORM CYLINDER

TECHNICAL FIELD OF THE INVENTION

The present invention relates to an arrangement for treatment of articles by hot pressing and, in particular, by hot isostatic pressing. In particular, the present invention relates to a pressing arrangement for treatment of articles by hot pressing, and preferably hot isostatic pressing, capable of providing a controlled, rapid cooling rate.

BACKGROUND OF THE INVENTION

Hot isostatic pressing (HIP) is a technology that finds more and more widespread use. Hot isostatic pressing is for instance used in achieving elimination of porosity in castings, such as for instance turbine blades, in order to substantially increase their service life and strength, in particular the fatigue strength. Another field of application is the manufacture of products, which are required to be fully dense and to have pore-free surfaces, by means of compressing powder.

In hot isostatic pressing, an article to be subjected to treatment by pressing is positioned in a load compartment of an insulated pressure vessel. A cycle, or treatment cycle, comprises the steps of: loading, treatment and unloading of articles, and the overall duration of the cycle is herein referred to as the cycle time. The treatment may, in turn, be divided into several portions, or phases, such as a pressing phase, a heating phase, and a cooling phase.

After loading, the vessel is sealed off and a pressure medium is introduced into the pressure vessel and the load compartment thereof. The pressure and temperature of the pressure medium is then increased, such that the article is subjected to an increased pressure and an increased temperature during a selected period of time. The temperature increase of the pressure medium, and thereby of the articles, is provided by means of a heating element or furnace arranged in a furnace chamber of the pressure vessel. The pressures, temperatures and treatment times are of course dependent on many factors, such as the material properties of the treated article, the field of application, and required quality of the treated article. The pressures and temperatures in hot isostatic pressing may typically range from 200 to 5000 bars, and preferably from 800 to 2000 bars and from 800° C. to 3000° C., and preferably from 800° C. to 2000° C. respectively.

When the pressing of the articles is finished, the articles often need to be cooled before being removed, or unloaded, from the pressure vessel. In many kinds of metallurgical treatment, the cooling rate will affect the metallurgical properties. For example, thermal stress (or temperature stress) and grain growth should be minimized in order to obtain a high quality material. Thus, it is desired to cool the material homogeneously and, if possible, to control the cooling rate. However, it is also of importance not to increase the total manufacturing costs of a pressing arrangement and/or the costs associated with operating the pressing arrangement in too large extent in attempt to satisfy the requirements with regard to desired cooling rate and homogenous cooling.

Figure 1A:
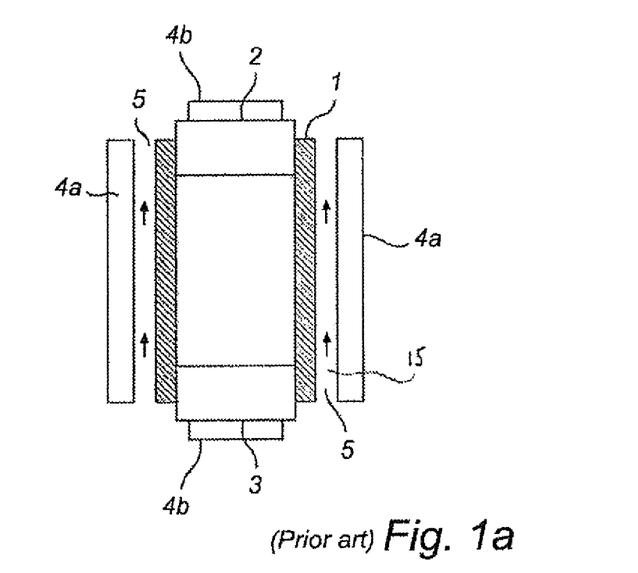
FIG. 1a is a schematical side view of a pressure vessel according to prior art.

Prior art hot isostatic pressing arrangements are often manufactured with uniform cylinder vessel walls and an outer cooling circuit in which a cooling liquid is circulated. Thereby, a transmission of heat or thermal energy through the vessel walls can be achieved. A traditional prior art pressure vessel cylinder is shown in FIG. 1a. The pressure vessel cylinder 1 is closed at the respective ends by means of upper and lower lids 2 and 3, respectively. Radial pre-stressing means 4a are provided around the envelope surface of the pressure vessel cylinder for accommodate radial forces exerted on the pressure vessel walls and axial pre-stressing means 4b are provided for accommodating axial forces exerted on the lids 2, 3. The radial pre-stressing means can be provided around the entire envelope surface of the pressure vessel cylinder. Due to the pre-stressing means 4a, 4b, the lids 2, 3 are capable of closing the pressure vessel 1 without any threading means or similar to attach the lids. Moreover, the outer wall of the pressure vessel 1 is provided with channels, or tubes, 5 in which a coolant for cooling may be provided. The coolant is preferably water, but other coolants are also contemplated. The flow of coolant is indicated in FIG. 1 by the arrows in the channels 5. During cooling, thermal energy is transferred from the warm pressure medium through the pressure vessel wall to the circulating cooling liquid. Furthermore, in order to be used in a pressing arrangement, the pressure vessel 1 is normally provided with means such a furnace, load compartment, heat isolation means etc., which not are shown in FIG. 1a for purposes of clarity.

Figure 1B:
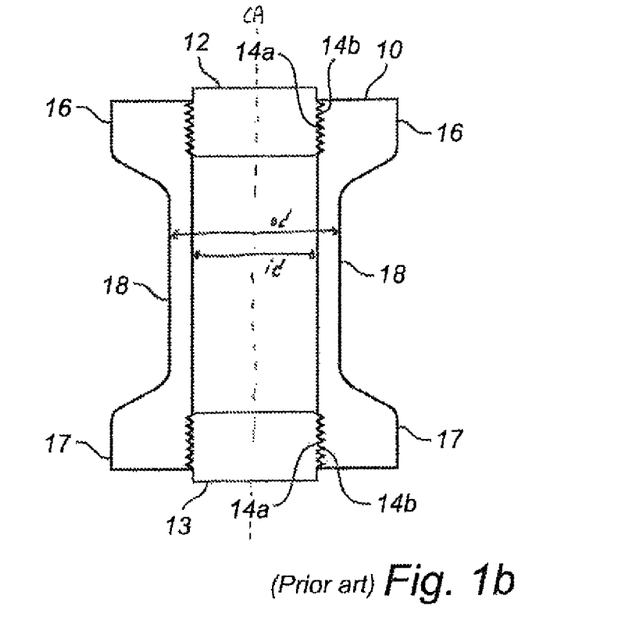
FIG. 1b is a schematical side view of another pressure vessel according to prior art.

In FIG. 1b, another prior art pressure vessel is shown. The pressure vessel 10 has a so called "dog-bone" design. This pressure vessel 10 is not provided with any pre-stressing means in this solution. In the illustrated configuration, the lids 12, 13 are attached to the pressure vessel 10 by means of threaded sections 14a and corresponding threaded sections 14b of the pressure vessel 10. Because there is no pre-stressing means for accommodating radial and axial forces exerted on the pressure vessel 10 and on the lids 12, 13, the pressure vessel 10 has to be made stronger, in particular, at the end portions where the lids are attached. To absorb the significant axial load exerted primarily from the lids, the pressure vessel 10 is provided with thick walls at the portions at the upper and lower lid. Thereby, the pre-stressing means can be omitted in this design. As can be seen in FIG. 1b, the upper and lower end portions 16, 17, respectively, of the pressure vessel wall are significantly thicker than the central portion 18 of the pressure vessel 10, which has a reduced thickness to save weight. A relation between outer diameter, od, and inner diameter, id, (od/id) is at least 1.2 (and often up to 1.3-1.4) at the central portion 18 where the vessel 10 has its thinnest wall thickness. At the thicker portion of the pressure vessel wall 16, the relation between outer diameter, od, and inner diameter, id, (od/id) is about 1.4-1.9. The significant radial and axial forces that have to be absorbed by the pressure vessel 10 require such high diameter relation od/id.

To provide an enhanced cooling capability, cooling elements are arranged in connection to the outer wall of the pressure vessel 10 in which a coolant is circulated. The coolant is preferably water, but other coolants are also contemplated. During cooling, thermal energy is transferred from the warm pressure medium through the pressure vessel wall to the circulating cooling liquid.

However, these prior art pressure vessels are impaired with drawbacks. The traditional uniform pressure vessel provided with axial and radial pre-stressing means may not provide a sufficiently rapid cooling without additional means for achieving such enhanced cooling. For example, heat exchangers have been suggested for that purpose. A heat exchanger arranged inside the pressure vessel do on the other hand add complexity in that, for example, pipes for supplying cooling medium has to be arranged in though holes of the pressure vessel. This may also entail increased maintenance needs.

The "dog-bone" solution, on the other hand, is very heavy due to the wall thickness despite the reduced wall thickness at the central portion.

To conclude, there is therefore a need within the art of improved pressure vessels for pressing arrangements capable of controlled, rapid and homogenous and cooling of articles and pressure medium.

SUMMARY OF THE INVENTION

A general object of the present invention is to provide an improved pressure vessel for a pressing arrangement, which enables a controlled, rapid and homogenous cooling.

A further object of the present invention is to provide an improved pressure vessel for a pressing arrangement that can be manufactured with a high degree of tolerance.

These and other objects of the present invention are achieved by means of a pressing arrangement having the features defined in the independent claims. Embodiments of the present invention are characterized in the dependent claims.

In the context of the present invention, the terms "cold" and "hot" or "warm" (e.g. cold and warm or hot pressure medium or cold and warm or hot temperature) should be interpreted in a sense of average temperature within the pressure vessel. Similarly, the term "low" and high" temperature should also be interpreted in a sense of average temperature within the pressure vessel.

According to an aspect of the present invention there is provided a pressure vessel for isostatic pressing comprising radially pre-stressing means arranged for exerting radial compressive forces on the pressure vessel. The pressure vessel is arranged with a non-uniform wall thickness, wherein the has portions with a thicker wall thickness at an upper and a lower end portion of said pressure vessel and having portions with a thinner wall thickness at a central portion of the pressure vessel where a substantial amount of the heat transmission from the pressure medium to a cooling circuit comprising a coolant occurs.

The pressure vessel according to the present invention is advantageously used in a pressing arrangement for hot isostatic pressing in connection of treatment of articles.

Generally, to achieve cooling within the pressure vessel and cooling of the articles being treated within the pressure vessel, pressure medium is circulated through the furnace chamber and a cooler region of the pressure vessel, such as the intermediate space outside the furnace chamber. Thus, while the amount of pressure medium contained in the furnace chamber is approximately constant, there is a positive net flow of heat away from the article in the furnace chamber.

The present invention is on an overall level concerned with enhancing and speeding up the cooling in a controlled manner. More specifically, the present invention is based on the insight that a controlled and rapid cooling of, for example, articles to a desired temperature can be achieved (i.e. the cooling rate can be significantly increased) by making the pressure vessel wall thinner at portions or parts where a significant amount of the heat is transferred to the cooling circuit in comparison to the end portions of the pressure vessel wall.

The pressures and temperatures in hot pressing, and hot isostatic pressing, may typically range from 200 to 5000 bars, and preferably, from 800 to 2000 bars and from 300° C. to 3000° C., and preferably from 800° C. to 2000° C., respectively. By arranging the pressure vessel with thin walls at selected parts or portions, the heat removal or heat transmission through the vessel wall to the coolant flowing through the cooling circuit arranged outside the pressure vessel wall can be greatly enhanced. However, the inventor has realized that providing the pressure vessel with a thinner vessel wall may entail a number of problems. For example, it may be difficult to process a pressure vessel having such thinner vessel wall to achieve or obtain the required tolerances. Another problem that might arise is that it may be difficult to attach necessary construction parts, such as e.g. end plates for holding a wire winding, at the upper and lower ends and of the pressure vessel if the pressure vessel wall is made thinner. Starting from this, the inventor has reached the further insight that the increased cooling rate can be achieved at the same time as the above-mentioned problems are eliminated if the pressure vessel is made with a non-uniform wall thickness where the upper and lower end of the pressure vessel has the thickest wall thickness and portions where a significant amount of the heat is transferred is made thinner. That is, the part or portion of the vessel having a thinner wall thickness is located where the significant heat transmission to the coolant occurs. In preferred embodiments, the pressure vessel has a diameter relation, od/id, of less than 1.2, typically 1.1 or less and preferably below 1.07 at a central portion of the pressure vessel.

The present invention provides a number of advantages in comparison to the prior art. For example, the high degree of tolerance required within the art can be maintained by making the end portions at the upper and lower end of the pressure vessel adjacent to upper and lower lids thicker than other portions of the vessel. Thereby, the end parts will be rigid and can be processed to obtain a desired and required tolerance. Further, by making portions of the pressure vessel wall thinner than the end portions where a significant amount of the heat transfer occur, the cooling rate can be increased significantly by the improved heat transfer between the hot pressure medium and the coolant flowing in the cooling circuit. Accordingly, an increased cooling rate can be achieved.

However, the present invention can be combined with, for example, a heat exchanger or heat sink arranged within the pressure vessel to even further increase and speed up the cooling rate.

A further advantage of the present invention, is that the control of the cooling procedure can be improved, which, in turn, leads to better quality of the articles processed by the hot pressing arrangement. For example, the articles are often tension free after the hot pressing procedure.

The present invention is also suitable in very large hot isostatic pressing arrangements. The larger a hot isostatic pressing arrangement is made, problems related to the cooling process due to, for example, will be more and more pronounced. For example, the large amounts of articles treated during a pressing procedure may lead to a cooling process that is more difficult to control. Another problem with large pressing arrangements is that the heat transfer or heat transmission often is poorer than in more regular sized pressing arrangements due to a larger pressure medium volume in relative to a vessel wall surface in comparison to a smaller pressure vessel arrangement.

By implementing the concept of the present invention, these problems can be overcome with or at least significantly reduced.

According to an embodiment of the present invention, the pressure vessel is cylinder shaped and arranged with a wall thickness being thinner at the cooling portion than a wall thickness at the lower and the upper end of the pressure vessel. Consequently, the heat transfer via the pressure vessel wall to the coolant flowing in the cooling circuit can be made very efficient.

According to preferred embodiments of the present invention, the wall thickness relationship between the end portions and the central portion is between about 1.1-2.5 and typically between 1.3-1.7.

According to embodiments of the present invention, the wall thickness of the pressure vessel is gradually reduced along tapered portions from the upper and lower end portions, respectively, to the central portion.

In embodiments of the present invention, an outer and/or inner wall of the pressure vessel is provided with steps resulting in a reduced thickness at said central portion.

According to embodiment of the present invention, the pressure vessel is arranged with an inner wall and/or an outer wall shaped so as to form a recess.

According to embodiments of the present invention, the radially pre-stressing means is provided around the envelope surface of the pressure vessel cylinder.

According to embodiments of the present invention, the radially pre-stressing means is arranged around the envelope surface of said recess formed in said outer wall.

Features from two or more embodiments outlined above can be combined, unless they are clearly complementary, in further embodiments. Likewise, the fact that two features are recited in different claim does not preclude that they can be combined to advantage.

The different embodiments of the present invention described herein can be combined, alone or in different combinations, with embodiments in different combinations described in the patent applications "Improved outer cooling loop" and "Pressing arrangement" filed on the same day as the present application by the same applicant. The content of the patent applications "Non-uniform cylinder" and "Pressing arrangement", respectively, are included herein by reference.

BRIEF DESCRIPTION OF FIGURES

Embodiments of the present invention will now be described with reference to the accompanying drawings, on which.

DETAILED DESCRIPTION OF EMBODIMENTS

The following is a description of exemplifying embodiments of the present invention. This description is intended for the purpose of explanation only and is not to be taken in a limiting sense. It should be noted that the drawings are schematic and that the pressing arrangements of the described embodiments comprise features and elements that are, for the sake of simplicity, not indicated in the drawings.

Embodiments of the pressing arrangement according to the present invention may be used to treat articles made from a number of different possible materials by pressing, in particular by hot isostatic pressing.

FIGS. 1a and 1b show pressure vessels according to prior art. Below, a number of embodiments of pressure vessels according to the present invention will be discussed with reference to FIGS. 2-7, which embodiments may be used in a pressing arrangement for hot isostatic pressing.

A pressure vessel usually is provided with means (not shown), such as one or more ports, inlets and outlets, for supplying and discharging a pressure medium. The pressure medium may be a liquid or gaseous medium with low chemical affinity in relation to the articles to be treated. When arranged in a pressing arrangement for hot isostatic pressing, the pressure vessel includes a furnace chamber (not shown), which comprises a furnace (or heater) (not shown), or heating elements, for heating of the pressure medium during the pressing phase of the treatment cycle. The person skilled in the art realises that it is possible to combine heating elements at the sides with heating elements at the bottom so as to achieve a furnace which is located at the sides and at the bottom of the furnace chamber. Clearly, any implementation of the furnace regarding placement of heating elements, known in the art, may be applied to the embodiments shown herein. It is to be noted that the term "furnace" refers to the means for heating, while the term "furnace chamber" refers to the volume in which load and furnace are located.

Furthermore, the outer wall of the pressure vessel may be provided with one or more cooling circuits 39 (see e.g. FIG. 2) including channels or tubes, in which a coolant for cooling may be provided. In this manner, the pressure vessel wall may be cooled in order to protect it from detrimental heat. The flow of coolant is indicated in the figures by the arrows. The use of an external cooling circuit 39 enables efficient cooling even though the pressure vessel can be carefully heat insulated for energy-economical operation. Additional benefit from external cooling of the pressure vessel can be achieved by providing flow guiding means, such as baffles, plates, flanges and channels, for guiding pressure medium from the relative vicinity of the outer wall of the pressure vessel towards an upstream side of the pump. Preferably, the guiding means are arranged in such manner that the pump forces a convective circulation loop of which a substantive portion is proximate to the externally cooled outer wall of the pressure vessel. This causes heat transfer away from the hot articles and out of the pressure vessel. As will be discussed below, the heat transfer can be significantly improved by the present invention.

In FIGS. 2-7, a number of different embodiments of the present invention are schematically illustrated and will hereinafter be discussed. In the following, only parts and elements related to the present invention will be discussed and described. Hence fittings inside the pressure vessel—including e.g. load compartment of the furnace chamber, casing, heat insulating portions, any apertures between a furnace chamber and an intermediate space will not be discussed in the following and are not shown in FIGS. 2-7.

Figure 2:
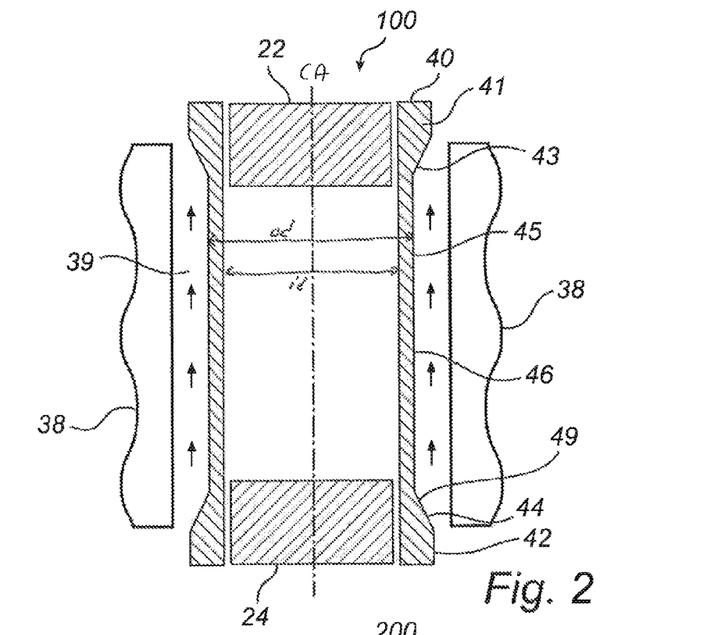
FIG. 2 is a schematical side view of a pressure vessel according to an embodiment of the present invention.

With reference to FIG. 2, a first embodiment of the present invention will be discussed. The pressure vessel 40 is arranged with a varying or non-uniform vessel wall thickness over its length. In preferred embodiments of the present invention, the pressure vessel 40 has a vertically elongated and cylindrical shape. At portions of the vessel at an upper end 41 and at a lower end 42 of the pressure vessel 40, where upper removable lid 22 and lower removable lid 24 are arranged, the pressure vessel wall 46 has its largest thickness. According to this embodiment, the pressure vessel 40 has tapered portions 43 and 44, hence entailing that the vessel wall thickness gradually decreases compared to the thickness of the end portions 41, 42 of the vessel 40. Further, the pressure vessel 40 has central portion 45 having a thinner wall thickness compared to the end portions 41, 42 and the tapered portions 43 and 44, where heat is primarily transferred to the coolant flowing in the cooling circuit 39. Thereby, the heat transfer between the pressure medium within the pressure vessel 40 and the coolant of the cooling circuit 39 can be significantly improved. According to this embodiment of the present invention, an outer wall 46 of the pressure vessel 40 is thus partly inclined (at the tapered portions 43, 44 of the pressure vessel 40) from the end portions 41 and 42, respectively, to the cooling portion 45 to form a recess 49. Radially pre-stressing means 38 is arranged around the envelope surface of the pressure vessel wall 46 for exerting radial compressive forces on the pressure vessel 1. In an embodiment of the present invention, the pre-stressing means 38 is band-shaped and wound around the envelope surface and arranged in the recess 49. The diameter relation, od/id, at a central portion 45 of the pressure vessel 10, is less than 1.2, typically 1.1 or less and preferably below 1.07.

Figure 3:
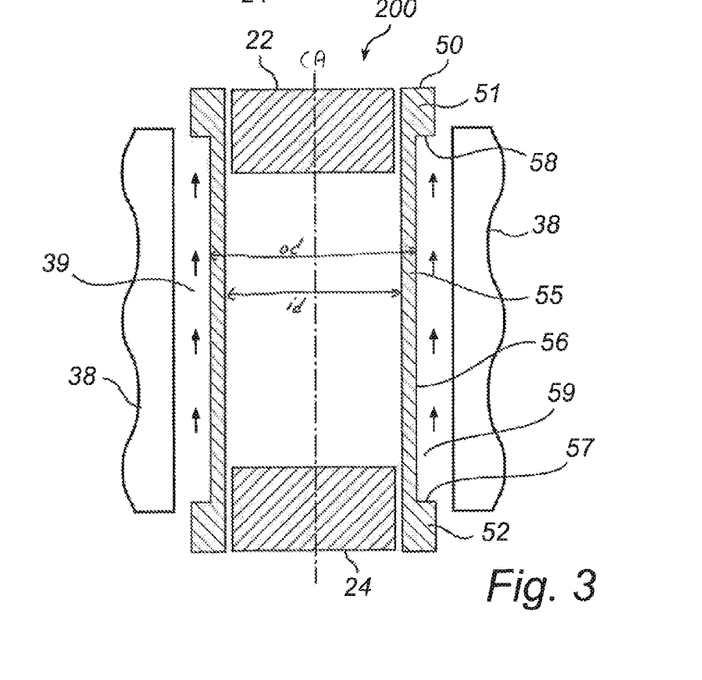
FIG. 3 is schematical side view of a pressure vessel according to a further embodiment of the present invention.

With reference now to FIG. 3, a second embodiment of the present invention will be discussed. The pressing arrangement 200 includes a pressure vessel 50 arranged with a varying or non-uniform vessel wall thickness over its length. In preferred embodiments of the present invention, the pressure vessel 50 has a vertically elongated and cylindrical shape. At portions of the vessel an upper end 51 and at a lower end 52 of the pressure vessel 50, where upper removable lid 22 and lower removable lid 24 are arranged, the pressure vessel wall thickness has its largest thickness. The outer pressure vessel wall 56 is provided with steps 57 and 58, which reduces the pressure vessel wall thickness abruptly between the upper end portion 51 and the lower end portion 52 on one hand compared to a central portion or cooling portion 55 so as to form a recess 59 in the outer pressure vessel wall 56. Hence, the pressure vessel 50 is provided with a thinner wall thickness over the cooling portion 55 of the vessel, where heat is primarily transferred to the coolant flowing in the cooling circuit 39. This entails that the heat transfer between the pressure medium within the pressure vessel 50 and the coolant of the cooling circuit can be greatly enhanced. According to this embodiment of the present invention, the outer wall 56 of the pressure vessel 50 is thus provided with steps 57, 58 between thicker wall portions 51, 52 and thinner wall portion 55. Radially pre-stressing means 38 is arranged around the envelope surface of the pressure vessel wall 56 for exerting radial compressive forces on the pressure vessel 1. In an embodiment of the present invention, the pre-stressing means 38 is band-shaped and wound around the envelope surface and arranged in the recess 59. The diameter relation, od/id, at a central portion 55 of the pressure vessel 50, is less than 1.2, typically 1.1 or less and preferably below 1.07.

Figure 4:
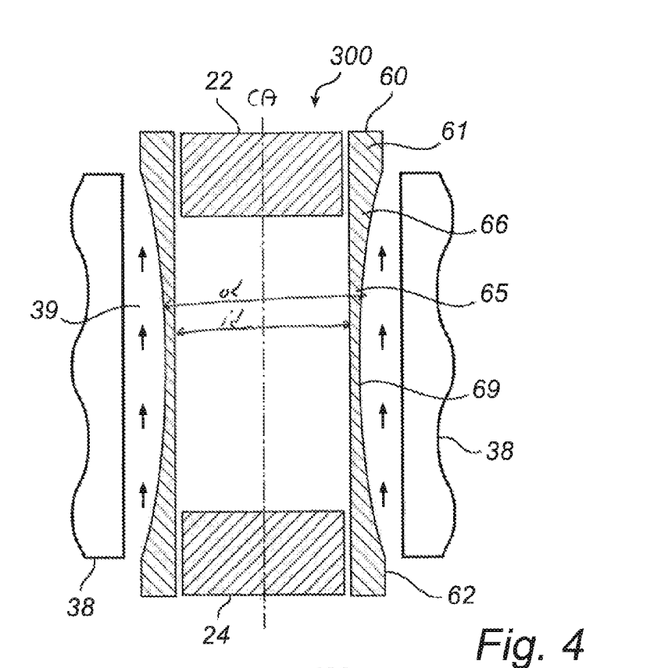
FIG. 4 is a schematical side view of a pressure vessel according to another embodiment of the present invention.

Turning now to FIG. 4, yet another embodiment of the present invention will be discussed. The pressing arrangement 300 includes a pressure vessel 60 arranged with a varying or non-uniform vessel wall thickness over its length. In preferred embodiments of the present invention, the pressure vessel 60 has a vertically elongated and cylindrical shape. At portions of the vessel an upper end 61 and at a lower end 62 of the pressure vessel 60, where upper removable lid 22 and lower removable lid 24 are arranged, the pressure vessel wall thickness has its largest thickness. The outer pressure vessel wall 66 is inclined from the upper end portion 61 to the lower end portion 62 so as to form a wide u-shaped recess 69 in the pressure vessel and, thereby, a central wall portion 65 having a thinner wall thickness compared to the end portions 61 and 62. Hence, the pressure vessel 60 has a thinner wall thickness over the central portion or cooling portion 65 of the vessel, where heat is primarily transferred to the coolant flowing in the cooling circuit 39. This entails that the heat transfer between the pressure medium within the pressure vessel 60 and the coolant of the cooling circuit can be greatly enhanced. Radially pre-stressing means 38 is arranged around the envelope surface of the pressure vessel wall 46 for exerting radial compressive forces on the pressure vessel 1. In an embodiment of the present invention, the pre-stressing means 38 is band-shaped and wound around the envelope surface. The diameter relation, od/id, at a central portion 65 of the pressure vessel 60, is less than 1.2, typically 1.1 or less and preferably below 1.07.

Figure 5:
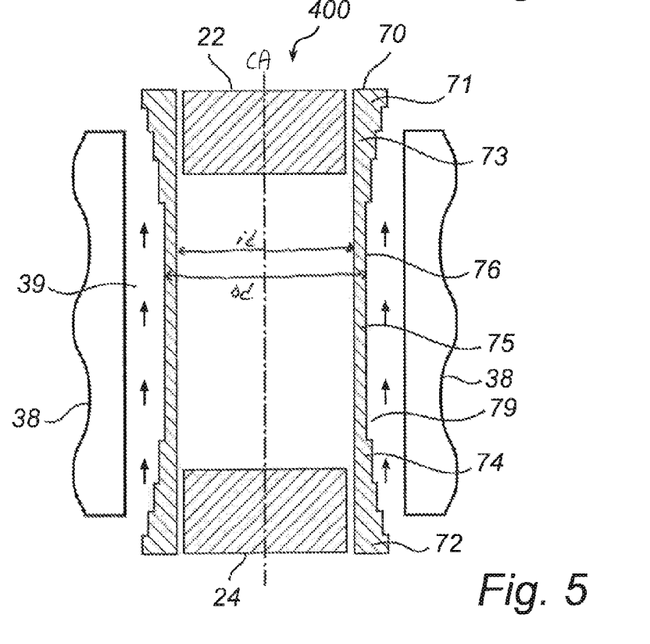
FIG. 5 is a schematical side view of a pressure vessel according to still another embodiment of the present invention.

With reference to FIG. 5, another embodiment of the present invention will be discussed. The pressing arrangement 400 includes a pressure vessel 70 arranged with a varying or non-uniform vessel wall thickness over its length. In preferred embodiments of the present invention, the pressure vessel 70 has a vertically elongated and cylindrical shape. At portions of the vessel an upper end 71 and at a lower end 72 of the pressure vessel 70, where upper removable lid 22 and lower removable lid 24 are arranged, the pressure vessel wall thickness has its largest thickness. The pressure vessel 70 comprises step-down portions 73 and 74 where the pressure vessel wall thickness in a step-wise manner is reduced from the end portions 71 and 72 to central or cooling portion 75. The outer pressure vessel wall 76 is provided with a number of steps to form a recess 79 such that the central wall portion 75 has a thinner wall thickness compared to the end portions 71 and 72. Hence, the pressure vessel 70 has a thinner wall thickness over the central portion or cooling portion 75 of the vessel, where heat is primarily transferred to the coolant flowing in the cooling circuit 39. This entails that the heat transfer between the pressure medium within the pressure vessel 70 and the coolant of the cooling circuit can be greatly enhanced. Radially pre-stressing means 38 is arranged around the envelope surface of the pressure vessel wall 76 for exerting radial compressive forces on the pressure vessel 1. In an embodiment of the present invention, the pre-stressing means 38 is band-shaped and wound around the envelope surface and arranged in the recess 79. The diameter relation, od/id, at a central portion 75 of the pressure vessel 70, is less than 1.2, typically 1.1 or less and preferably below 1.07.

Figure 6:
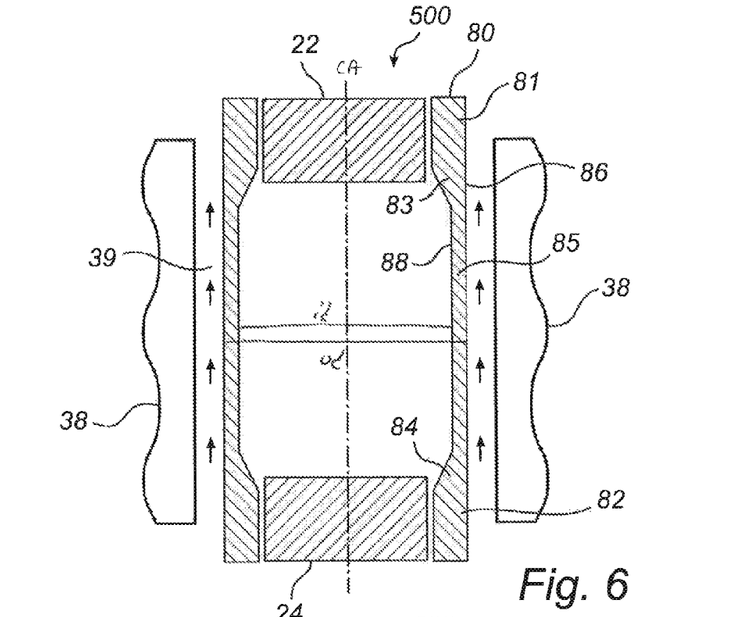
FIG. 6 is a schematical side view of a pressure vessel according to a further embodiment of the present invention.

With reference to FIG. 6, another embodiment of the present invention will be discussed. The pressing arrangement 500 includes a pressure vessel 80 arranged with a varying or non-uniform vessel wall thickness over its length. In preferred embodiments of the present invention, the pressure vessel 80 has a vertically elongated and cylindrical shape. At portions of the vessel an upper end 81 and at a lower end 82 of the pressure vessel 80, where upper removable lid 22 and lower removable lid 24 are arranged, the pressure vessel wall thickness has its largest thickness. According to this embodiment, the pressure vessel 80 has tapered portions 83 and 84, hence entailing that the vessel wall thickness gradually decreases compared to the thickness of the end portions 81, 82 of the vessel 80. Further, the pressure vessel 80 has central portion or cooling portion 85 having a thinner wall thickness compared to the end portions 81, 82 and the tapered portions 83 and 84. The wall of the vessel 80 has a thinner wall thickness over the cooling portion 85 of the vessel, where heat is primarily transferred to the coolant flowing in the cooling circuit 39. Thereby, the heat transfer between the pressure medium within the pressure vessel 80 and the coolant of the cooling circuit 39 can be significantly improved. According to this embodiment of the present invention, an inner wall 88 of the pressure vessel 80 is thus partly inclined (at the tapered portions 83, 84 of the pressure vessel 80) from the end portions 81 and 82 to the cooling portion 85 in comparison to the outer pressure vessel wall 86 and forms a wide recess 89 between the end portions 81 and 82. Radially pre-stressing means 38 is arranged around the envelope surface of the pressure vessel wall 86 for exerting radial compressive forces on the pressure vessel 1. In an embodiment of the present invention, the pre-stressing means 38 is band-shaped and wound around the envelope surface. The diameter relation, od/id, at a central portion 85 of the pressure vessel 80, is less than 1.2, typically 1.1 or less and preferably below 1.07.

Figure 7:
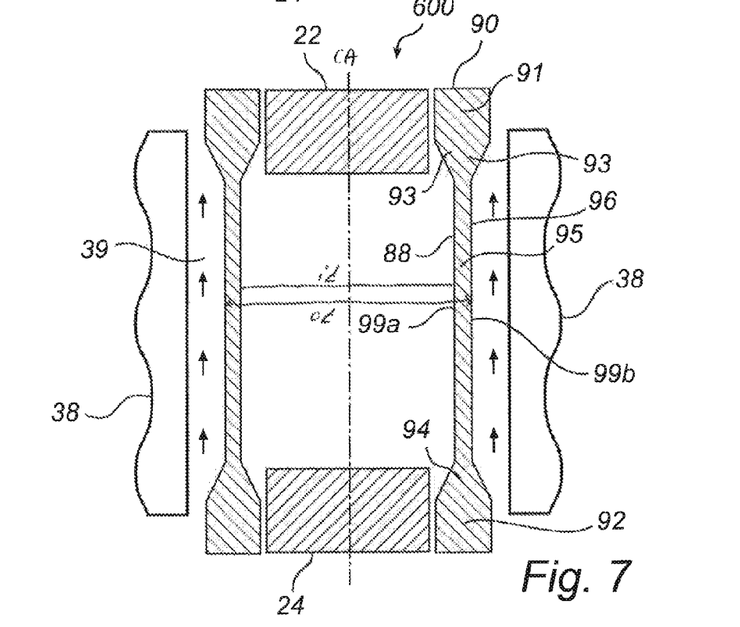
FIG. 7 is a schematical side view of a pressure vessel according to a further embodiment of the present invention.

With reference now to FIG. 7, another embodiment of the present invention will be discussed. The pressing arrangement 600 includes a pressure vessel 90 arranged with a varying or non-uniform vessel wall thickness over its length. In preferred embodiments of the present invention, the pressure vessel 90 has a vertically elongated and cylindrical shape. At portions of the vessel at an upper end 91 and at a lower end 92 of the pressure vessel 90, where upper removable lid 22 and lower removable lid 24 are arranged, the pressure vessel wall 96, 98 has its largest thickness. According to this embodiment, the pressure vessel 90 has tapered portions 93 and 94, hence entailing that the vessel wall thickness gradually decreases compared to the thickness of the end portions 91, 92 of the vessel 90. Further, the pressure vessel 90 has central portion 95 having a thinner wall thickness compared to the end portions 91, 92 and the tapered portions 93 and 94. The wall of the vessel 40 has a thinner wall thickness over the central portion or cooling portion 95 of the vessel, where heat is primarily transferred to the coolant flowing in the cooling circuit 39. Thereby, the heat transfer between the pressure medium within the pressure vessel 90 and the coolant of the cooling circuit 39 can be significantly improved. According to this embodiment of the present invention, an outer wall 96 of the pressure vessel 90 is thus partly inclined (at the tapered portions 93, 94 of the pressure vessel 90) from the end portions 91 and 92 to the cooling portion 95 to form a recess 99b. Further to this embodiment of the present invention, an inner wall 98 of the pressure vessel 90 is partly inclined (at the tapered portions 93, 94 of the pressure vessel 90) from the end portions 91 and 92, respectively, to the cooling portion 95 to form a recess 99a. Radially pre-stressing means 38 is arranged around the envelope surface of the pressure vessel wall 96 for exerting radial compressive forces on the pressure vessel 1. In an embodiment of the present invention, the pre-stressing means 38 is band-shaped and wound around the envelope surface and arranged in the recess 99b. The diameter relation, od/id, at a central portion 95 of the pressure vessel 90, is less than 1.2, typically 1.1 or less and preferably below 1.07.

Even though the present description and drawings disclose embodiments and examples, including selections of components, materials, temperature ranges, pressure ranges, etc., the invention is not restricted to these specific examples. Numerous modifications and variations can be made without departing from the scope of the present invention, which is defined by the accompanying claims.

EXAMPLE 1

According to an example pressing arrangement according to the present invention, an outer diameter, od, is 1590 mm and an inner diameter, id, is 1450 mm at the end portions of the pressure vessel. The diameter relation at the end portions is hence about 1.1. The vessel wall thickness at the end portions is 70 mm. At the central portion of the pressure vessel, the wall thickness is between 40-60 mm. Accordingly, the diameter relation is about 1.06-1.08 at the central portion of the pressure vessel. A pressing arrangement having the above dimension is produced by the applicant under a model name QIH232. A wall thickness of 50 mm at the central portion entails an improved transfer of thermal energy of about 40% compared to a pressure vessel having a uniform wall thickness.

The invention claimed is:

1. A pressure vessel for isostatic pressing comprising:
   radially pre-stressing means arranged for exerting radial compressive forces on the pressure vessel, with the pressure vessel being arranged with a non-uniform wall thickness; and
   said wall having portions with a thicker wall thickness at an upper and a lower end portion of the pressure vessel and having portions with a thinner wall thickness at a central portion of the pressure vessel, with a diameter relationship between an outer diameter and an inner diameter of the pressure vessel being less than 1.2 at a central portion of the pressure vessel;
   wherein the pressure vessel is arranged with an inner wall shaped so as to form a recess in the inner wall resulting in a reduced thickness at the central portion.

2. The pressure vessel according to claim 1, wherein said wall thickness is gradually reduced along tapered portions from said upper and lower end portions to the central portion.

3. The pressure vessel according to claim 1, wherein at least one of said outer and inner walls of the pressure vessel is provided with steps resulting in a reduced thickness at the central portion.

4. The pressure vessel according to claim 1, wherein the pressure vessel is arranged with an outer wall shaped so as to form a recess.

5. The pressure vessel according to claim 1, wherein said radially pre-stressing means is provided around the envelope surface of the pressure vessel.

6. The pressure vessel according to claim 4, wherein said radially pre-stressing means is arranged around the envelope surface of the recess formed in said outer wall.

7. The pressure vessel according to claim 1, wherein said wall has portions with a thicker wall thickness at said upper and said lower end portion of the pressure vessel and has portions with a thinner wall thickness at the central portion of the pressure vessel where a substantial amount of the heat transmission from the pressure medium to a cooling circuit comprising a coolant occurs, with a wall thickness relationship between said end portions and the central portion entails an improved cooling effect being reciprocally proportional to the reduced wall thickness of the central portion in relationship to the wall thickness of the end portions.

8. A pressure vessel for isostatic pressing comprising:
   radially pre-stressing means arranged for exerting radial compressive forces on the pressure vessel, with the pressure vessel being arranged with a non-uniform wall thickness; and
   said wall having portions with a thicker wall thickness at an upper and a lower end portion of the pressure vessel and having portions with a thinner wall thickness at a central portion of the pressure vessel, with a diameter relationship between an outer diameter and an inner diameter of the pressure vessel being less than 1.2 at a central portion of the pressure vessel;
   wherein an inner surface of the wall of the pressure vessel is provided with steps resulting in a reduced thickness at the central portion.

9. A pressure vessel for isostatic pressing comprising:
radially pre-stressing means arranged for exerting radial compressive forces on the pressure vessel, with the pressure vessel being arranged with a non-uniform wall thickness; and
said wall having portions with a thicker wall thickness at an upper and a lower end portion of the pressure vessel and having portions with a thinner wall thickness at a central portion of the pressure vessel, with a diameter relationship between an outer diameter and an inner diameter of the pressure vessel being less than 1.2 at a central portion of the pressure vessel;
wherein said wall thickness is gradually reduced along tapered portions from said upper and lower end portions to said central portion by inner surfaces of the walls of said pressure vessel being partly inclined from said upper and lower end portions to said central portion.

* * * * *